United States Patent
Lee

(10) Patent No.: US 6,471,620 B2
(45) Date of Patent: Oct. 29, 2002

(54) CONTROL METHOD FOR AUTOMATIC TRANSMISSION

(75) Inventor: Hee-Yong Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 33 days.

(21) Appl. No.: 09/730,738

(22) Filed: Dec. 7, 2000

(65) Prior Publication Data

US 2001/0003720 A1 Jun. 14, 2001

(30) Foreign Application Priority Data

Dec. 10, 1999 (KR) .............................. 99-56539

(51) Int. Cl.⁷ .............................................. F16H 61/04
(52) U.S. Cl. ........................... 477/181; 477/54; 477/77; 477/62
(58) Field of Search ..................... 477/77, 54, 62, 477/111, 168, 181, 107

(56) References Cited

U.S. PATENT DOCUMENTS

| | | | |
|---|---|---|---|
| 5,086,889 A | * | 2/1992 | Nobumoto et al. ........ 192/3.31 |
| 5,562,571 A | * | 10/1996 | Maruyama et al. ......... 477/174 |
| 5,807,209 A | * | 9/1998 | Matsubara et al. ......... 477/169 |
| 5,923,042 A | * | 7/1999 | Mietta et al. ............... 250/235 |

* cited by examiner

Primary Examiner—Sherry Estremsky
Assistant Examiner—Eric M. Williams
(74) Attorney, Agent, or Firm—Birch, Stewart, Kolasch & Birch, LLP

(57) ABSTRACT

In a control method for an automatic transmission, it is first determined if the automatic transmission is in a fourth speed and the vehicle is being driven in a power off state, then a damper clutch operation slip control signal is output when the vehicle is in a power off state. Next, an engine fuel cut-in rpm reduction signal is output to engine control unit when a damper clutch is operated by the damper clutch operation slip control signal. A lower engine fuel cut-in signal is transmitted from the engine control unit according to the output engine fuel cut-in rpm reduction signal. Then, it is determined if engine output is undergoing continuous reduction, and a duty ratio is controlled using a learned value during 4–3 shifting when engine output is being reduced.

6 Claims, 4 Drawing Sheets

CONTROL METHOD FOR AUTOMATIC TRANSMISSION

BACKGROUND OF THE INVENTION (a) Field of the Invention

The present invention relates to a control method for an automatic transmission, and more particularly, to a control method for an automatic transmission in which an operational range of a damper clutch is increased when in a fourth speed, power off state.

(b) Description of the Related Art

General control of an automatic transmission includes control to minimize torque fluctuations and improve shift quality. In particular, such control reduces engine output torque when it is necessary to retard ignition timing or cut off fuel such that shift shock is reduced and a clutch wears more slowly.

With reference to FIG. 4, in a power off state in which engine torque is less than output shaft load (i.e., where a throttle valve is closed), the conventional control method performs control such that a damper clutch is set on non-operational slip control. That is, the damper clutch is controlled to non-operational slip control at a first point P1 (i.e., power off), over an entire drive range. Next, at a second point P2, which is an end of an interval t1 where a torque valve opening becomes 0% and fuel supply is reduced, a fuel cut-off interval t2 is started in which fuel supplied to the engine is cut off. At roughly the second point P2 of the fuel cut-off interval t2, engine rpm Ne become less than turbine rpm Nt of a torque converter.

At a third point P3, which is at an end of the cut-off interval t2 or where engine rpm Ne are approximately 1200, engine rpm Ne are slightly increased, again decreased until reaching an idle state, then maintained at this level. This slight increase in engine rpm Ne, which is effected by an increase in the supply of fuel at the designated point, is done to prevent engine stall.

However, with the use of the above fuel cut-in control to prevent engine stall, because of the difference between engine rpm and turbine rpm, backlash shock is generated in a powertrain and noise is generated as a result of the backlash shock when converting to power off from power on.

SUMMARY OF THE INVENTION

The present invention has been made in an effort to solve the above problems.

It is an object of the present invention to provide a control method for an automatic transmission in which an operational range of a damper clutch is increased when in a fourth speed, power off state, thereby improving shift feel and reducing fuel consumption.

To achieve the above object, the present invention provides a control method for an automatic transmission comprising the steps of (a) determining if the automatic transmission is in a fourth speed and the vehicle is being driven in a power off state; (b) outputting a damper clutch operation slip control signal if the vehicle is in a power off state; (c) outputting an engine fuel cut-in rpm reduction signal to engine control means if a damper clutch is operated by the damper clutch operation slip control signal; (d) receiving a lower engine fuel cut-in signal from the engine control means according to the output engine fuel cut-in rpm reduction signal; (e) determining if engine output is undergoing continuous reduction; and (f) controlling a duty ratio using a learned value during 4–3 shifting if engine output is being reduced.

According to a feature of the present invention, the transmission is controlled by a conventional method if the vehicle is not in a power off state in step (a).

According to another feature of the present invention, if it is determined that engine output is not being reduced in step (e), an engine fuel cut-in rpm reduction discontinue signal is output to the engine control means, after which the automatic transmission is controlled using the conventional method.

According to yet another feature of the present invention, the engine fuel cut-in rpm reduction discontinue signal is a signal for converting the reduced engine fuel cut-in rpm to the engine fuel cut-in rpm conventionally used.

According to still yet another feature of the present invention, the engine fuel cut-in rpm reduction signal is a signal for reducing engine output to a predetermined engine fuel cut-in rpm.

According to still yet another feature of the present invention, the conventional engine fuel cut-in rpm are 1,200 rpm and the predetermined engine fuel cut-in rpm are 1,000 rpm

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
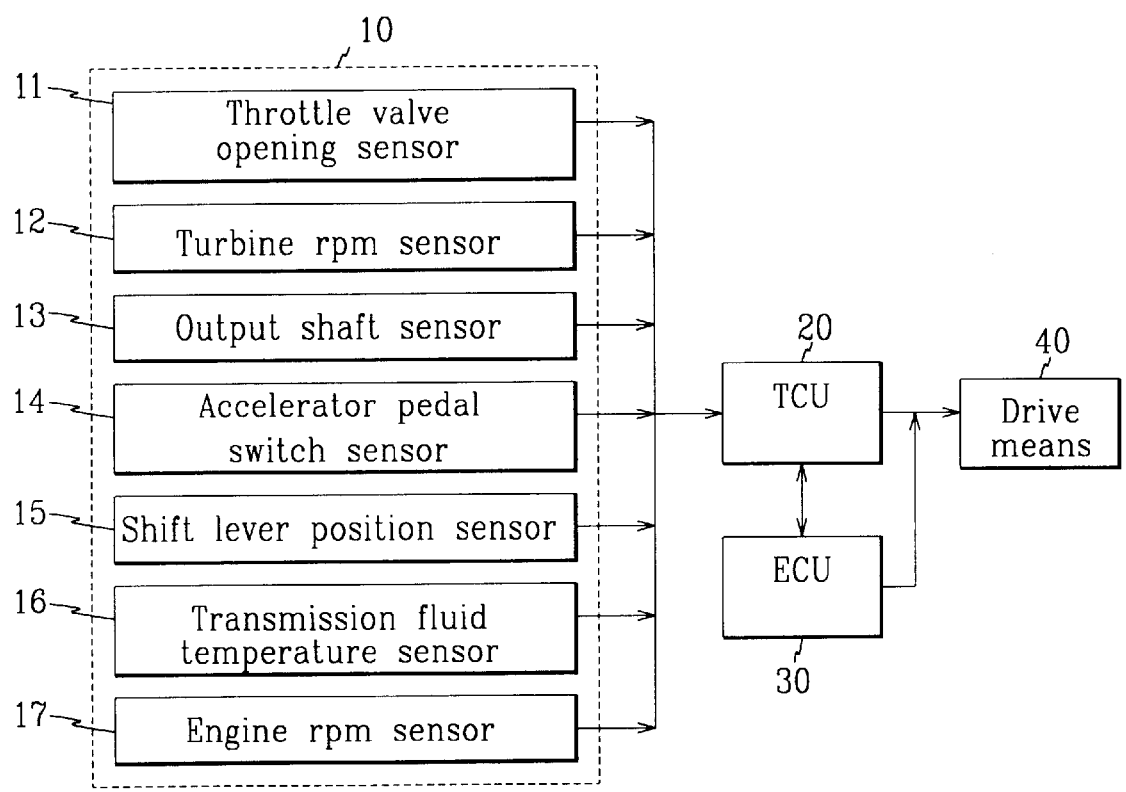
FIG. 1 is a block diagram of a control system for an automatic transmission to which the present invention is applied.

FIG. 1 is a block diagram of a control system for an automatic transmission to which the present invention is applied.

The automatic transmission control system comprises a detection unit 10 for performing the detection of various elements and states of an engine, a TCU (transmission control unit) 20 for performing control of a transmission, an ECU (engine control unit) 30 for performing control of an engine, and drive means 40.

The detection unit 10 includes a throttle valve opening sensor 11 for detecting a throttle valve opening, a turbine rpm sensor 12 for detecting turbine rpm, an output shaft rpm sensor 13 for detecting rpm of an output shaft, an accelerator pedal switch sensor 14, a shift lever position sensor 15, a transmission fluid temperature sensor 16, and an engine rpm sensor 17 for detecting engine rpm.

The TCU 20 receives signals output by the detection unit 10, and if the vehicle is driving in a power off state and the transmission is in fourth speed, outputs a damper clutch operation slip control signal and outputs an engine fuel cut-in rpm reduction signal such that engine output is reduced. The TCU 20 also controls a duty ratio of a damper clutch during 4–3 shifting using a learned value. The ECU 30 outputs a low engine fuel cut-in signal if the engine fuel cut-in rpm reduction signal is output from the TCU 20. The drive means 40, according to the signals output by the TCU 20 and the ECU 30, effects shift synchronization into a target shift range, and performs control to reduce and increase engine output.

Figure 2:
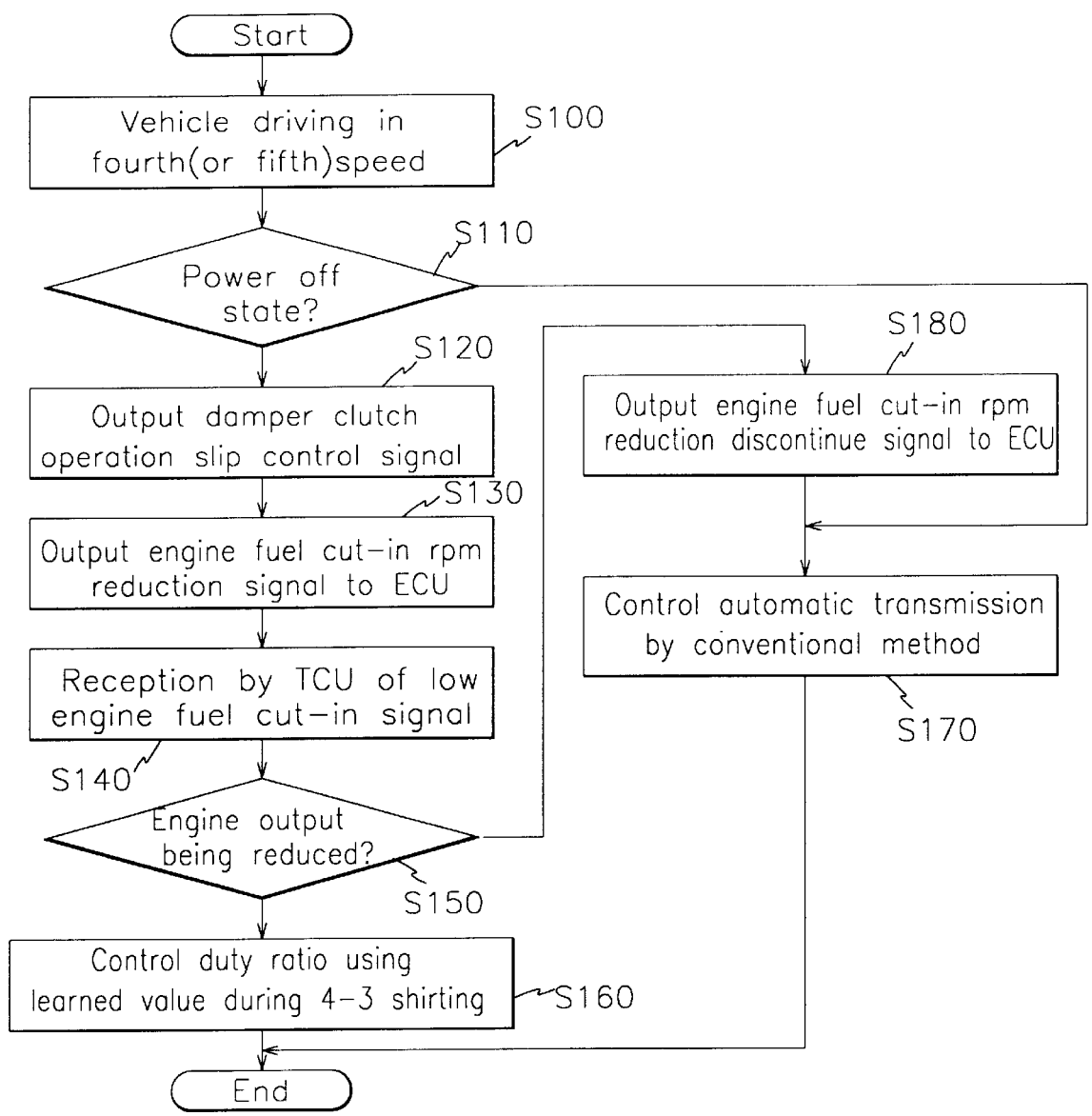
FIG. 2 is a flow chart of a control method for an automatic transmission according to a preferred embodiment of the present invention.

FIG. 2 shows a flow chart of a control method for an automatic transmission according to a preferred embodiment of the present invention.

The TCU 20, which performs control of the transmission using a predetermined program, receives signals from the detection unit 10. That is, the 20 throttle valve opening sensor 11 detects throttle valve opening Th, the turbine rpm sensor 12 detects turbine rpm Nt, the output shaft rpm sensor 13 detects output shaft rpm, the accelerator pedal switch sensor 14 detects an accelerator pedal operational state, the shift lever position sensor 15 detects a shift lever position, a transmission fluid temperature sensor 16 detects transmission fluid temperature, and the engine rpm sensor 17 detects engine rpm Ne, after which corresponding signals are output to the TCU 20.

Using these signals, it is determined by the TCU 20 when the vehicle is driving in fourth speed (in a five-speed automatic transmission, it is determined when the vehicle is driving in fourth or fifth speed) in step S100. Next, the TCU 20 determines if the vehicle is driving in a power off state in step S110. If the vehicle is driving in a power off state, the TCU 20 outputs a damper clutch operation slip control signal to the drive means 40 in step S120. At this time, the operation of a damper clutch D/C is performed according to throttle valve opening Th and turbine rpm Nt, and a slip degree of the damper clutch D/C is determined according to engine rpm Ne and turbine rpm Nt such that control can be performed to approach a target slip degree.

If the damper clutch D/C is operated by the output of the damper clutch operation slip control signal in step S120, the TCU 20 outputs an engine fuel cut-in rpm reduction signal to the ECU 130 in step S130. Accordingly, the TCU 20 receives a low engine fuel cut-in signal (set at, for example, 1,000 rpm) from the ECU 30 in step S140. The drive means 40 is controlled by this signal output from the ECU 30. The engine fuel cut-in rpm reduction signal above is a signal for reducing engine output to a predetermined engine fuel cut-in rpm (i.e., 1,000 rpm), where engine fuel cut-in rpm are, for example, 1,200 rpm.

The TCU 20, which receives the low engine fuel cut-in signal from the ECU 30 in step S140, determines if engine output is being reduced in step S150 using the signals output by the detection unit 10. If engine output is being reduced (by the cut-off of engine fuel in a power off state), the TCU 20 controls a duty ratio using a learned value such that the damper clutch D/C is controlled with a reduced amount of hydraulic pressure of during 4–3 shifting in step S160. Accordingly, the drive means 40 is controlled by a shift control signal output by the TCU 20 to thereby effect shift synchronization from the fourth speed to the third speed.

In step S110, if the TCU 20 determines that the vehicle is not in a power off state, the automatic transmission is controlled by a conventional method in step S170. Also, in step S150, if the TCU 20 determines that engine output is not being reduced, the TCU 20 outputs an engine fuel cut-in rpm reduction discontinue signal to the ECU 30 in step S180, after which step S170 of controlling the automatic transmission using the conventional method is performed. The engine fuel cut-in rpm reduction discontinue signal is a signal for converting the reduced engine fuel cut-in rpm to the engine fuel cut-in rpm conventionally used.

Accordingly, the ECU 30 outputs a control signal for controlling engine output in the normal manner. Further, the engine fuel cut-in rpm reduction discontinue signal of the TCU 20 is generated as a result of the damper clutch D/C being disengaged. Since the response time to disengage the damper clutch D/C is fast (60 ms), the problem of stopping the engine during control conversion of the ECU 30 is not encountered.

Figure 3:
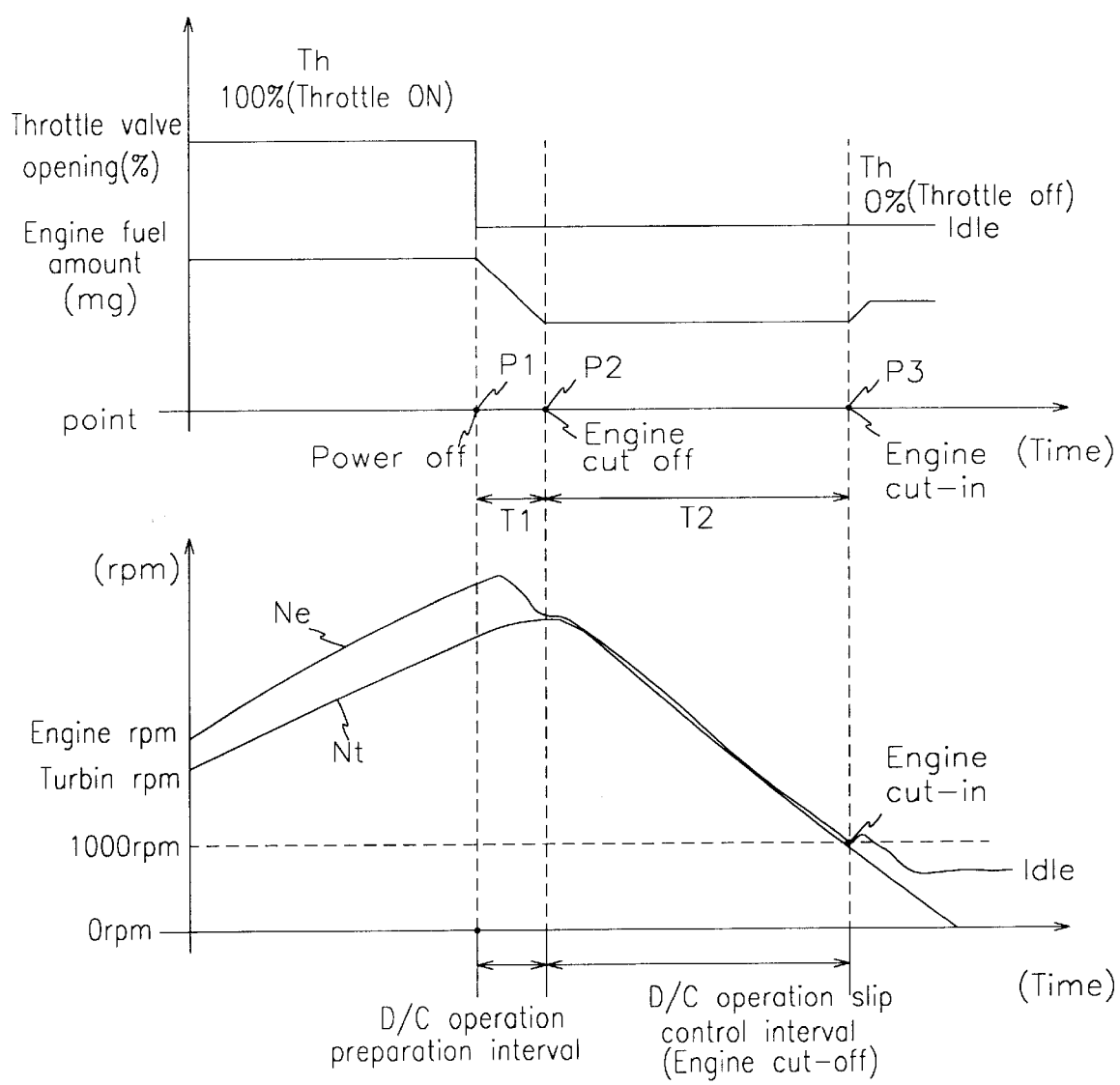
FIG. 3 is a graph of various parameters of an engine to which the control method of the present invention is applied.
Figure 4:
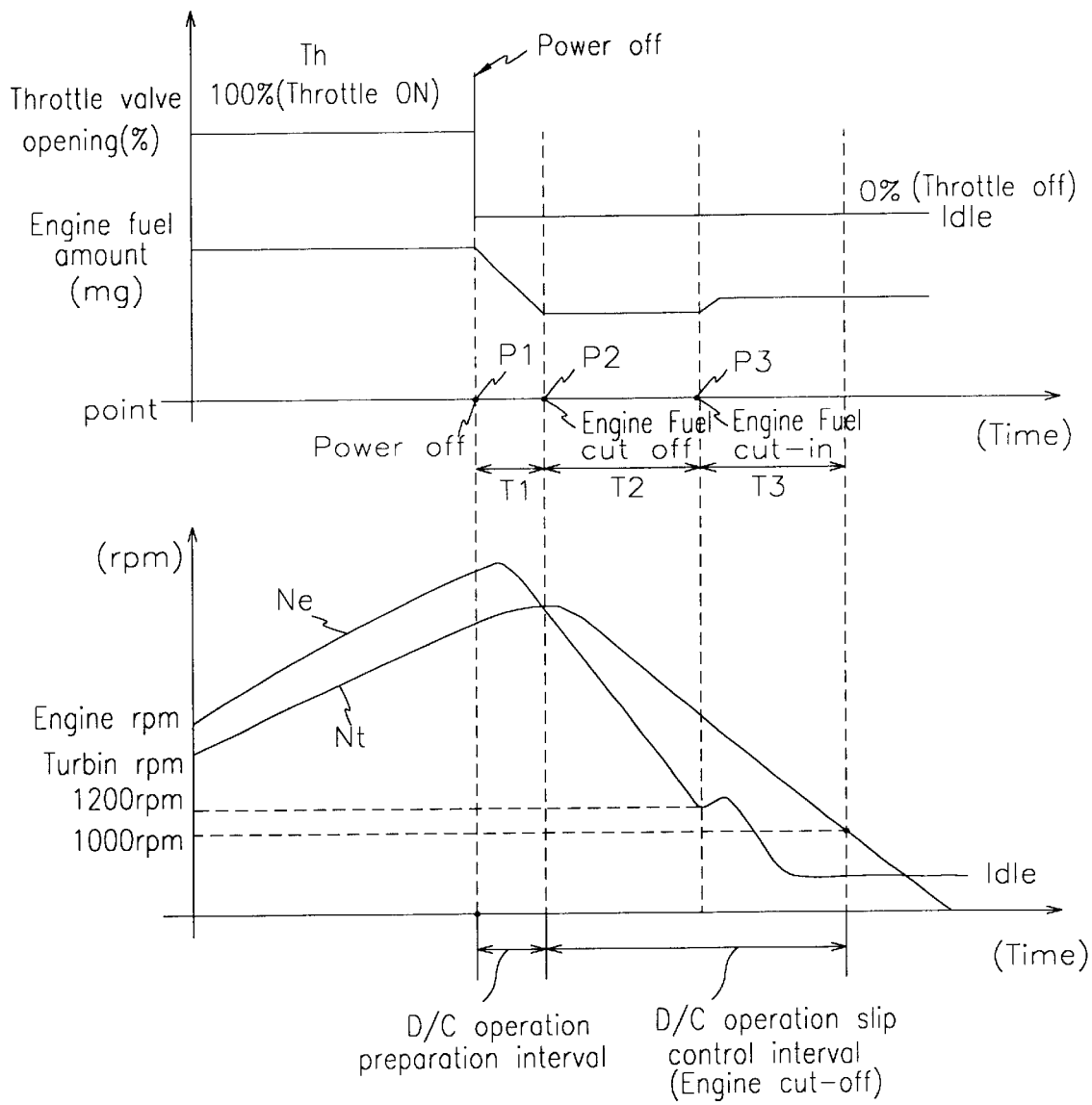
FIG. 4 is a graph of various parameters of an engine to which a conventional control method is applied.

FIG. 3 shows a graph of various parameters of an engine to which the control method of the present invention is applied.

At a first point P1 (i.e., power off), over an entire drive range, the TCU 20 controls the damper clutch D/C to an operational slip state. Next, at a second point P2, which is at an end of an interval t1 where throttle valve opening becomes 0% and fuel supply is reduced, a fuel cut-off interval t2 is started in which fuel supplied to the engine is cut off. At roughly the second point P2 of the fuel cut-off interval t2, engine rpm Ne and turbine rpm Nt of a torque converter are almost identical.

During the fuel cut-off interval t2, engine rpm Ne and turbine rpm Nt are reduced together. A third point P3, which is an engine fuel cut-in point where fuel supply to the engine is started, is established where engine rpm Ne are, for example, 1000 rpm. At the third point P3, engine rpm Ne are slightly increased, again decreased to an idle state, then maintained at this level. Accordingly, engine stall is prevented.

In the control method for an automatic transmission of the present invention described above, if the vehicle is in the power off state and the highest speed, the engine fuel cut in rpm are reduced to a lower level such that the difference in turbine rpm and engine rpm is removed, thereby preventing backlash shock in the power train and the noise associated with this problem.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A control method for an automatic transmission comprising the steps of:

(a) determining if the automatic transmission is in a fourth speed and the vehicle is being driven in a power off state;

(b) outputting a damper clutch operation slip control signal when the vehicle is in a power off state;

(c) outputting an engine fuel cut-in rpm reduction signal to an engine control unit when a damper clutch is operated by the damper clutch operation slip control signal;

(d) receiving an engine fuel cut-in signal from the engine control unit according to the output engine fuel cut-in rpm reduction signal;

(e) determining if engine output is undergoing continuous reduction; and (f) controlling a duty ratio using a learned value during 4–3 shifting when engine output is being reduced.

2. The method of claim 1 wherein the transmission is controlled by a conventional method if the vehicle is not in a power off state in step (a).

3. The method of claim 2 wherein if it is determined that engine output is not being reduced in step (e), an engine fuel cut-in rpm reduction discontinue signal is output to the engine control means, after which the automatic transmission is controlled using the conventional method.

4. The method of claim 3 wherein the engine fuel cut-in rpm reduction discontinue signal is a signal for converting the reduced engine fuel cut-in rpm to the engine fuel cut-in rpm conventionally used.

5. The method of claim 1 wherein the engine fuel cut-in rpm reduction signal is a signal for reducing engine output to a predetermined engine fuel cut-in rpm.

6. The method of claim 5 wherein the conventional engine fuel cut-in rpm are 1,200 rpm and the predetermined engine fuel cut-in rpm are 1,000 rpm.

* * * * *